United States Patent
Pöri et al.

(10) Patent No.: US 12,478,911 B2
(45) Date of Patent: Nov. 25, 2025

(54) FILTER ASSEMBLY, FILTER BAG AND METHOD OF REPLACING A FILTER BAG

(71) Applicant: Leanfil Oy, Vantaa (FI)

(72) Inventors: Samu Pöri, Vantaa (FI); Heikki Pöri, Vantaa (FI); Tommi Lustig, Vantaa (FI)

(73) Assignee: Leanfil Oy, Vantaa (FI)

( * ) Notice: Subject to any disclaimer, the term of this patent is extended or adjusted under 35 U.S.C. 154(b) by 417 days.

(21) Appl. No.: 18/009,776

(22) PCT Filed: Jan. 28, 2021

(86) PCT No.: PCT/FI2021/050056
§ 371 (c)(1),
(2) Date: Dec. 12, 2022

(87) PCT Pub. No.: WO2021/250310
PCT Pub. Date: Dec. 16, 2021

(65) Prior Publication Data
US 2023/0294030 A1    Sep. 21, 2023

(30) Foreign Application Priority Data

Jun. 12, 2020 (FI) .................... 20205606

(51) Int. Cl.
| | |
|---|---|
| *B01D 29/27* | (2006.01) |
| *B01D 46/00* | (2022.01) |
| *B01D 46/02* | (2006.01) |
| *B01D 46/88* | (2022.01) |
| *F24F 8/108* | (2021.01) |

(52) U.S. Cl.
CPC ........... *B01D 46/023* (2013.01); *B01D 29/27* (2013.01); *B01D 46/0005* (2013.01); *B01D 46/88* (2022.01); *F24F 8/108* (2021.01); *B01D 2265/024* (2013.01); *B01D 2265/028* (2013.01);
(Continued)

(58) Field of Classification Search
CPC ............................... B01D 29/13; B01D 29/27
See application file for complete search history.

(56) References Cited

U.S. PATENT DOCUMENTS

| | | |
|---|---|---|
| 2008/0236120 A1 | 10/2008 | Li et al. |
| 2009/0049810 A1 | 2/2009 | Green et al. |

FOREIGN PATENT DOCUMENTS

| | | |
|---|---|---|
| AU | 686044 B2 * | 8/1996 |
| DE | 29517898 U1 | 12/1996 |

(Continued)

*Primary Examiner* — Robert A Hopkins
(74) *Attorney, Agent, or Firm* — Laine IP Oy

(57) ABSTRACT

The disclosure relates to a filter assembly (16) comprising a frame (6) comprising a frame part (6.1) having a top side (7a), a bottom side (7d), inner edges (7c) defining an aperture (26) and outer edges (7b) forming an outer perimeter of the frame part (6.1), and a bag-like insert (11) comprising filter material and having an open upper portion (14) and at least one closed bottom portion. The insert (11) is fitted into the aperture (26) of the frame (6) with the open upper portion (14) bent over the frame part (6.1) to cover the top side (7a), the outer edges (7b) and at least part of the bottom side (7d) of the frame part (6.1). The upper portion (14) of the insert (11), which is bent over the frame (6), comprises a stretch region (27) made of stretchable material. The insert (11) is fastened to the frame (6) by a pressing force generated by the stretch region (27) against the frame (6).

17 Claims, 5 Drawing Sheets

(52) U.S. Cl.
CPC ...... *B01D 2271/02* (2013.01); *B01D 2279/35* (2013.01)

(56) References Cited

FOREIGN PATENT DOCUMENTS

| | | | |
|---|---|---|---|
| JP | 2011161429 | A | 8/2011 |
| WO | WO2005093334 | A1 | 10/2005 |
| WO | WO2006126937 | A1 | 11/2006 |
| WO | WO2017210237 | A1 | 12/2017 |

\* cited by examiner

FILTER ASSEMBLY, FILTER BAG AND METHOD OF REPLACING A FILTER BAG

FIELD

The present invention relates to air filters used in buildings. More specifically, the invention relates to bag filters having a frame with a bag-like filter cloth arranged within the frame, which may be used as a unit to be inserted transversely in an air duct or the like.

BACKGROUND

Fans or blowers are used along with ductwork to circulate air through a room or area of a building. The blower typically draws air from within the room through an exhaust air duct and fresh air is supplied into the room through a supply air duct. To heat or cool the air, the blower may also force or draw the air across a heat exchanger.

To prevent dust from accumulating on various equipment, and on the ductwork, filters may be installed adjacent to the blower. Filters create a pressure drop that reduces the amount of airflow. To minimize the pressure drop, the cross-sectional area of the filter is usually increased by adding pleats to the filter cloth, installing the filter at an angle relative to the duct, or by forming the filter as an elongated bag that extends lengthwise into an air duct.

All filters must be changed from time to time according to the maintenance cycle of the building. Used air duct filters, such as bag filters, are usually discarded and replaced by new ones. Depending on the number of ducts and the blowers and their size, the number of replacement filters in one maintenance cycle may vary from one to hundreds. A typical filter usually consists of a durable metal or plastic frame, with intermediate bars that form slots in one direction across the frame. In these slots, filter cloth bags are fastened between the intermediate bars or otherwise, in a pleated fashion.

When a filter is discarded, also the metallic (or plastic) frame is thrown away. This, of course, is a waste of resources. Individual filter bags are usually not intended to be removable from the frames, and are attached to the frames by any means from underneath. Thus the frames get dirty from the dust, debris and fatty substances (e.g. in a kitchen) that flows into a return duct, and they would need to be removed anyway.

There is thus a need for improvements in such maintenance work, in order to find a solution to the filter waste problem and to reduce the amount of work needed while performing filter changes.

The present invention aims to reduce the above-mentioned problems.

The invention is defined by the independent claim.

According to one aspect of the present disclosure a filter assembly comprises a frame comprising a frame part having a top side, a bottom side, inner edges defining an aperture and outer edges forming an outer perimeter of the frame part, and a bag-like insert comprising filter material and having an open upper portion and at least one closed bottom portion. The insert is fitted into the aperture of the frame with the open upper portion bent over the frame part to cover the top side, the outer edges and at least part of the bottom side of the frame part. The upper portion of the insert, which is bent over the frame part, comprises a stretch region made of stretchable material. The insert is fastened to the frame by a pressing force generated by the stretch region against the frame.

According to a second aspect of the present disclosure a filter bag comprising a filter region and a stretch region. The filter region is made of filter material and forms an open upper portion and at least one closed bottom portion. The upper portion (14) defines a periphery. The stretch region is made of stretchable and/or elastic material different to the filter material. The stretch region is provided to and around the periphery of the upper portion of the filter region. The stretch region is configured to press against and cover the frame part of a filter assembly according to the first aspect.

According to a third aspect of the present disclosure a method of replacing a filter bag of a filter assembly according to the first aspect is proposed. In the method an old filter bag is removed by first stretching the stretch region and then removing the upper portion of the filter bag from around the frame and the bottom portion of the filter bag from the aperture. A new filter bag is installed by first fitting the bottom portion of the filter bag into the aperture and then stretching stretch region over and around the frame.

The invention offers considerable advantages.

No fastening of individual filter bags is needed. The whole filter insert is just inserted into the frame and the upper portion of the insert is bent over the frame part to cover the top side, the outer edges and at least part of the bottom side of the frame part. Thereafter, the stretch region of the insert presses the upper part of the insert against the frame part and thus fastens the insert to the frame. Thus, the insert can be fastened to and detached from the frame in a fast and simple manner, without any additional fastening means, such as zip or tape fasteners. This reduces the amount of maintenance work required to replace the filters. Further, the insert and the filter assembly according to the invention can also be manufactured with low costs.

Apart from the obvious one of providing re-usable filter assembly frames, the frames are also always clean as at least the upper side of the frame is always covered by the filter material or the material of the stretch region, such as elastic band/rubber band.

The filter assembly can comprise two or more parallel frames installed side by side. In this embodiment the insert materials bent over the adjacent frames are in contact with each other and form a seal between the frames. This prevents air leakage through a gap between the adjacent frames. There is thus no need to use a separate seal between the frames.

According to an embodiment of the invention the frame comprises a second frame part projecting from the bottom side of the frame part and having inner edges defining the aperture and outer edges forming an outer perimeter of the second frame part. The outer diameter of the second frame part is smaller than that of the frame part, and the stretch region of the upper portion is bent over the outer edges of the second frame part. In this embodiment the second frame part supports the insert and prevents the insert fitted into the aperture of the frame from adhering to the fixing rail of the ventilation unit and ripping during the installation of the filter assembly to the fixing rail.

Filter assemblies where the frame is made of wood may be disposed of in environmentally friendly ways by recycling, or they may be burned. Frames made of other materials may also be easily recycled, as the filter insert is removable.

In some embodiments, the frame is provided with parallel intermediate bars across said aperture that defines slots across the aperture. The insert may then have multiple bags formed in a pleated fashion having a shared open upper portion and separate closed bottom portions. Each bag may then be arranged to fit into one corresponding slot.

According to some embodiments, frame has the shape of a rectangle or a square, but of course also other shapes are possible, such as a circle. The frame is preferably made of a rigid material, such as wood, metal, a polymer material, fiberglass, carbon fiber, or a composite material comprising any one of the above materials. However, flexible materials may also come into use, if the rigidity needed to retain the filter assembly in place is provided by other means.

DETAILED DESCRIPTION OF EMBODIMENTS

References to a "bag-like insert" throughout this disclosure may be replaced with a "filter bag", which is a synonym for a "bag-like insert" in the field.

Figure 1:
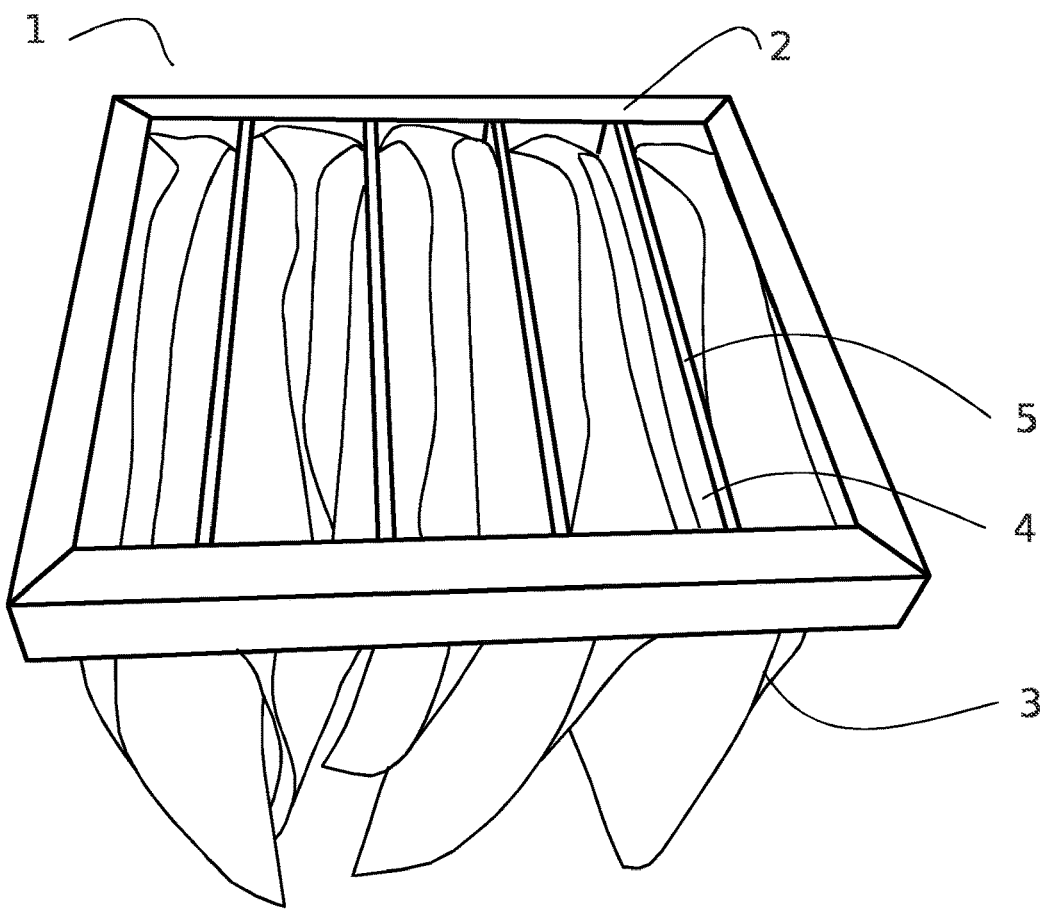
FIG. 1 shows a filter assembly according to prior art.

In FIG. 1 is shown a filter assembly 1 according to prior art with a frame 2, intermediate bars 4 and with one filter bag 3 attached 5 between each slot formed by the intermediate bars 4, or at the edges, by an intermediate bar 4 and the frame 2. The air flow direction is from the upper or top side of the frame 2 downwards to the bags and the filtered air exits the filter through the bottoms of the bags 3.

Figure 2:
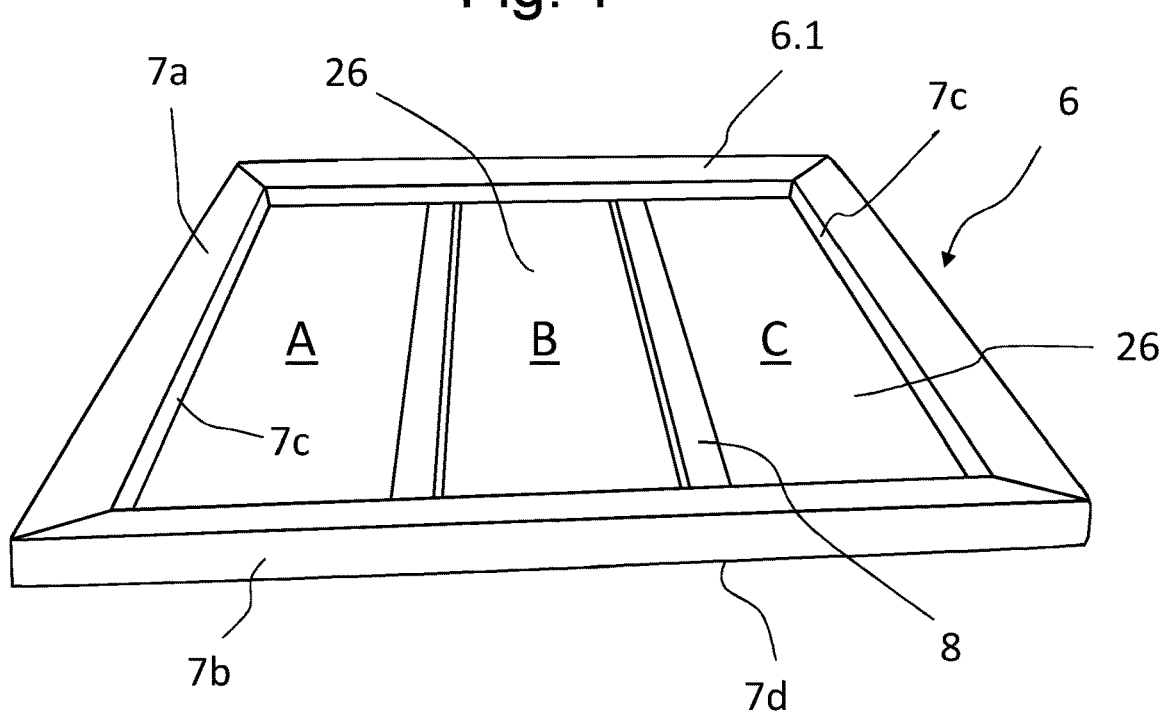
FIG. 2 shows an exemplary frame of a filter assembly according to one embodiment of the disclosure.

In FIG. 2 is shown a frame 6 of a filter assembly 16 according to an embodiment of the present disclosure. The frame 6 has the shape of a rectangle or a square, but of course also other shapes are possible, such as a circle. The frame 6 comprises a frame part 6.1 having a top side 7a, outer edges 7b, inner edges 7c and a bottom side 7d. The top side 7a and the bottom side 7d are on the opposite sides of the frame part 6.1. The inner edges 7c define an aperture 26 for a bag-like insert 11 (shown in FIGS. 4 and 5). The frame 6 comprises intermediate bars 8 extending across the aperture 26. The intermediate bars 8 in turn define three slots A, B and C. Obviously, depending on the size, circumstances, and requirements of the filter assembly, the number of slots is a design criteria and may vary from one to any number upwards. The outer edges 7b form the outer perimeter of the frame part 6.1.

Figure 3A:
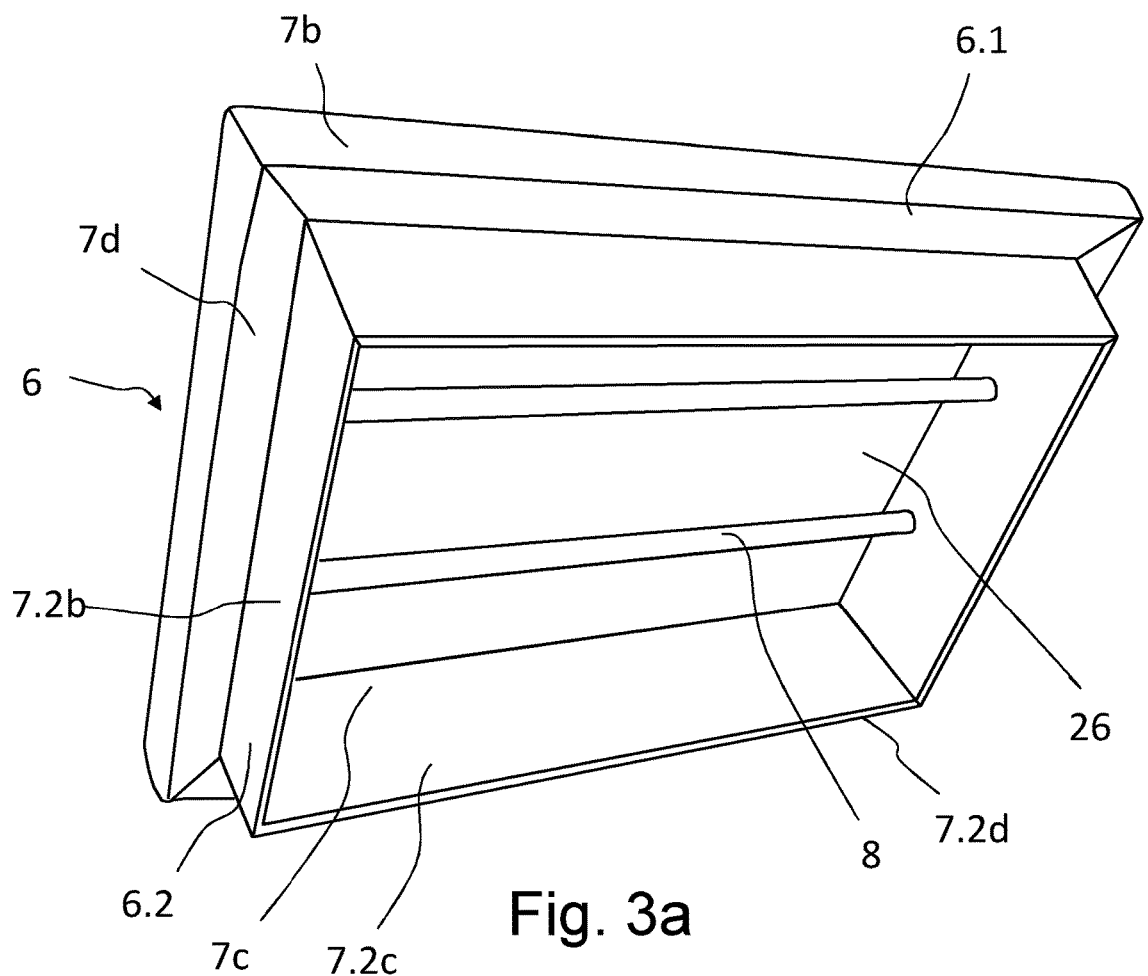
FIGS. 3a and 3b show an exemplary frame of a filter assembly according to another embodiment of the disclosure.
Figure 3B:
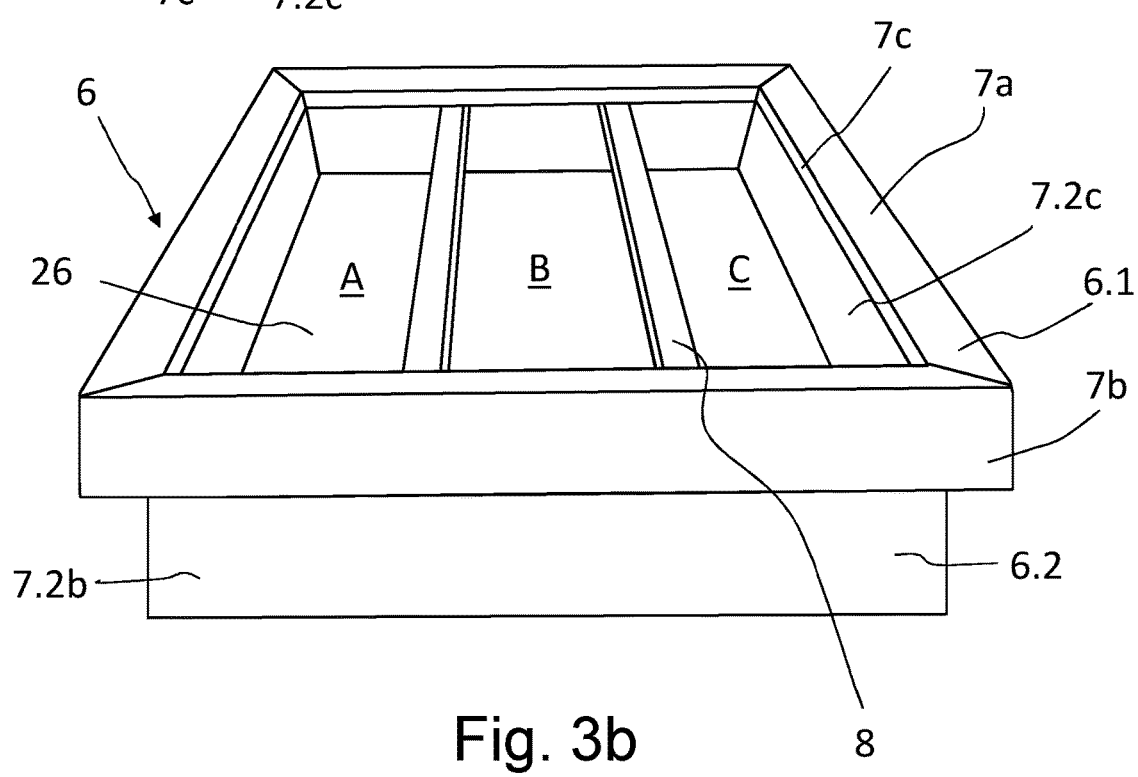

In an embodiment shown in FIGS. 3a and 3b the frame 6 has an L-shaped cross-section. The frame 6 comprises a frame part 6.1, e.g. a frame part shown in FIG. 2, and second frame part 6.2 projecting from the bottom side 7d of the frame part 6.1. The second frame part 6.2 may be attached to the bottom side 7d of the first frame part 6.1. The second frame part 6.2 may be integral with the frame part 6.1. The second frame part 6.2 comprises outer edges 7.2b, inner edges 7.2c and a bottom side 7.2d. The inner edges 7.2c of the second frame part 6.2 define the aperture 26 together with the inner edges 7c of the frame part 6.1. The inner edges 7.2c of the second frame part 6.2 are flush with the inner edges 7c of the frame part 6.1. The outer edges 7.2b form the outer periphery of the second frame part 6.2. The outer diameter of the second frame part 6.2 is smaller than that of the frame part 6.1.

The frame 6 comprises intermediate bars 8 extending across the aperture 26. The intermediate bars 8 in turn defines three slots A, B and C. Obviously, depending on the size, circumstances and requirements of the filter assembly, the number of slots is a design criteria and may vary from one to any number upwards.

Figure 4:
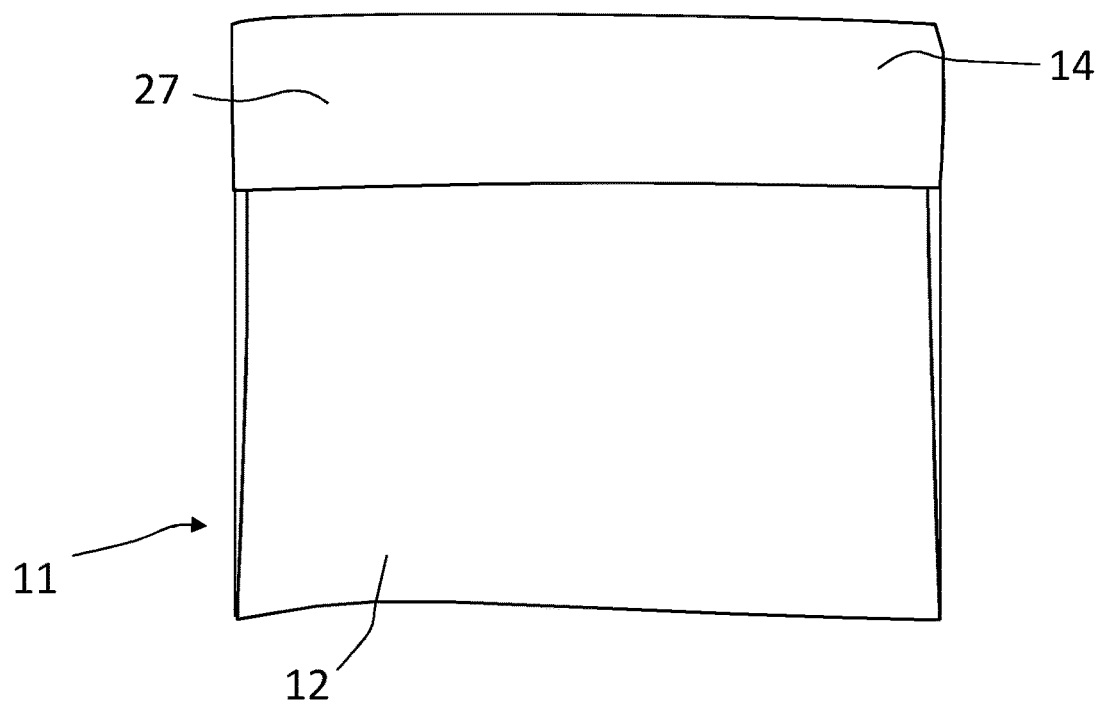
FIGS. 4 and 5 show an insert of a filter assembly according to one embodiment of the disclosure.
Figure 5:
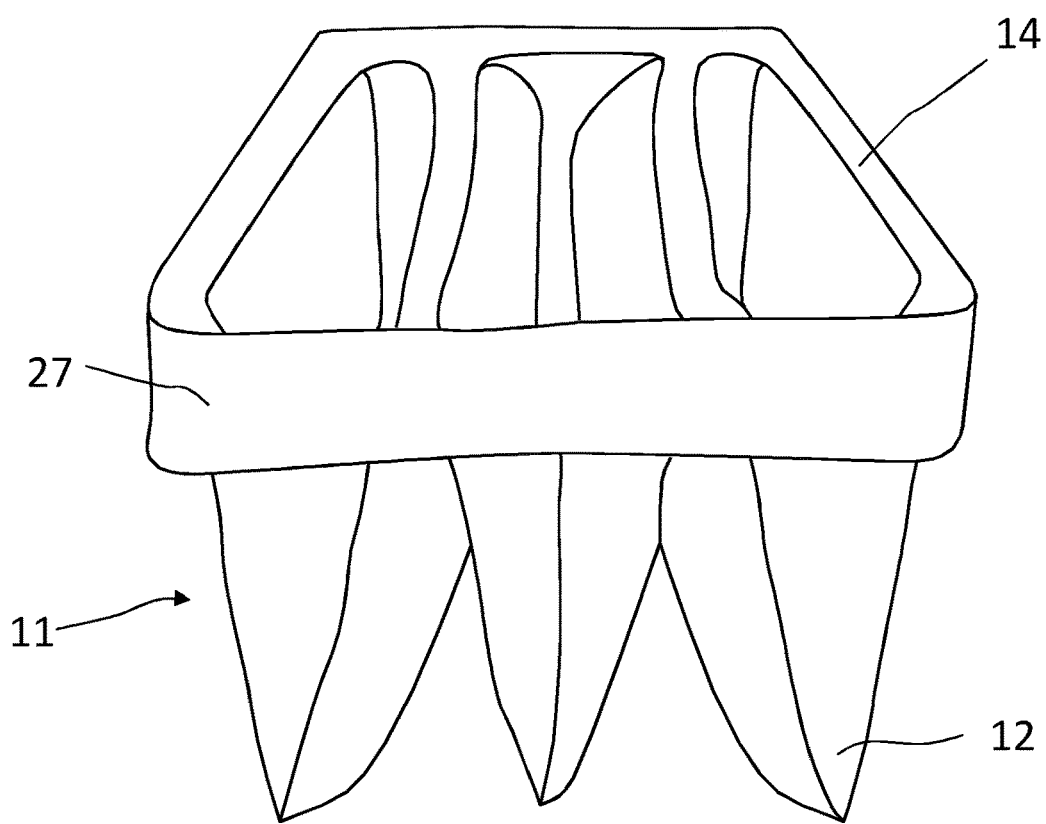

In FIGS. 4 and 5 is shown a bag-like insert 11 according to one embodiment which is configured to fit into the aperture 26 of the frame 6. The frame 6 can be of the type shown in FIG. 2 or 3. The insert 11 comprises or is made of filter material. The insert 11 has an open upper portion 14 and at least one closed bottom portion. The insert 11 comprises at least one bag formed in a pleated fashion. The open upper portion 14 is shared by multiple bags formed in a pleated fashion, in this embodiment three bags 12. The filter material of the insert 11 depends on the application and may thus be made of a variety of materials, such as paper, cotton, polyester, nano fibers, synthetic fibers, glass fiber, etc.

The upper portion 14 of the insert 11 comprises a stretch region 27 made of stretchable and/or elastic material. The material of the stretch region 27 can comprise rubber/latex and/or stretchable fabric, such as elastane. The stretch region 27 extends around the entire periphery of the upper portion 14. The stretch region 27 is located in an area of the opening of the insert 11. The stretch region 27 extends from the edge defining the opening of the insert 11 towards the closed bottom portion of the insert 11. The material of the stretch region 27 is more stretchable and/or more elastic than the filter material of the insert 11 and/or the insert material outside of the stretch region 27. To be more precise, the stretch region 27 is preferably made from a material that is different to the material of the filtering part of the insert 11, i.e. the material of the bags 12. The stretch region 27 may be attached to the upper portion 14 of the insert 11 by sewing or by using thermosetting glue, for example. The stretch region 27 can be made of rib material, such as rib fabric. The stretch region 27 can comprise an elastic and stretchable band, such as a rubber/latex, fabric/elastane band. The elastic and stretchable band extends around the periphery of the upper portion 14. The stretch region 27 is configured to press against the frame 6, e.g. against the frame part 6.1 and/or the second frame part 6.2, and thus fasten the insert 11 to the frame 6. The insert 11 is fastened to the frame 6, e.g. to the frame part 6.1 and/or to the second frame part 6.2, by the pressing force of the stretch region 27.

According to one embodiment the stretch region 27 comprises a mixture of nylon and latex, rubber or Spandex. In particular, the nylon on the outer surface provides for a low-friction surface, while the elastic later, rubber or Spandex component provides for the required resilient properties. The mixture may be manufactured by, for example, with the Jacquard technique.

According to another embodiment the stretch region 27 comprises a mixture of polyester, cotton and acrylic. The mixture may be manufactured by, for example, with the Jacquard technique.

The stretch portion 27 may be attached to the upper portion 14 of the filter material such that length of the stretch portion 27, when sewed or otherwise attached to the filter material, is shorter than the circumferential length of the edge defining the opening of the insert 11. According to a particular embodiment the length of the stretch portion 27 in a resting, i.e. non-stretched, state is 20% or more than 20% shorter than the edge defining the opening of the insert 11. For practical reasons it is advisable to sew the stretch portion 27 in a stretched state, wherein the lengths of the stretch portion 27 and the corresponding edge of the filter material match. It follows that the relative shortness of the stretch portion 27 provides for a default tightening of the insert 11 around the frame 6.

Figure 6:
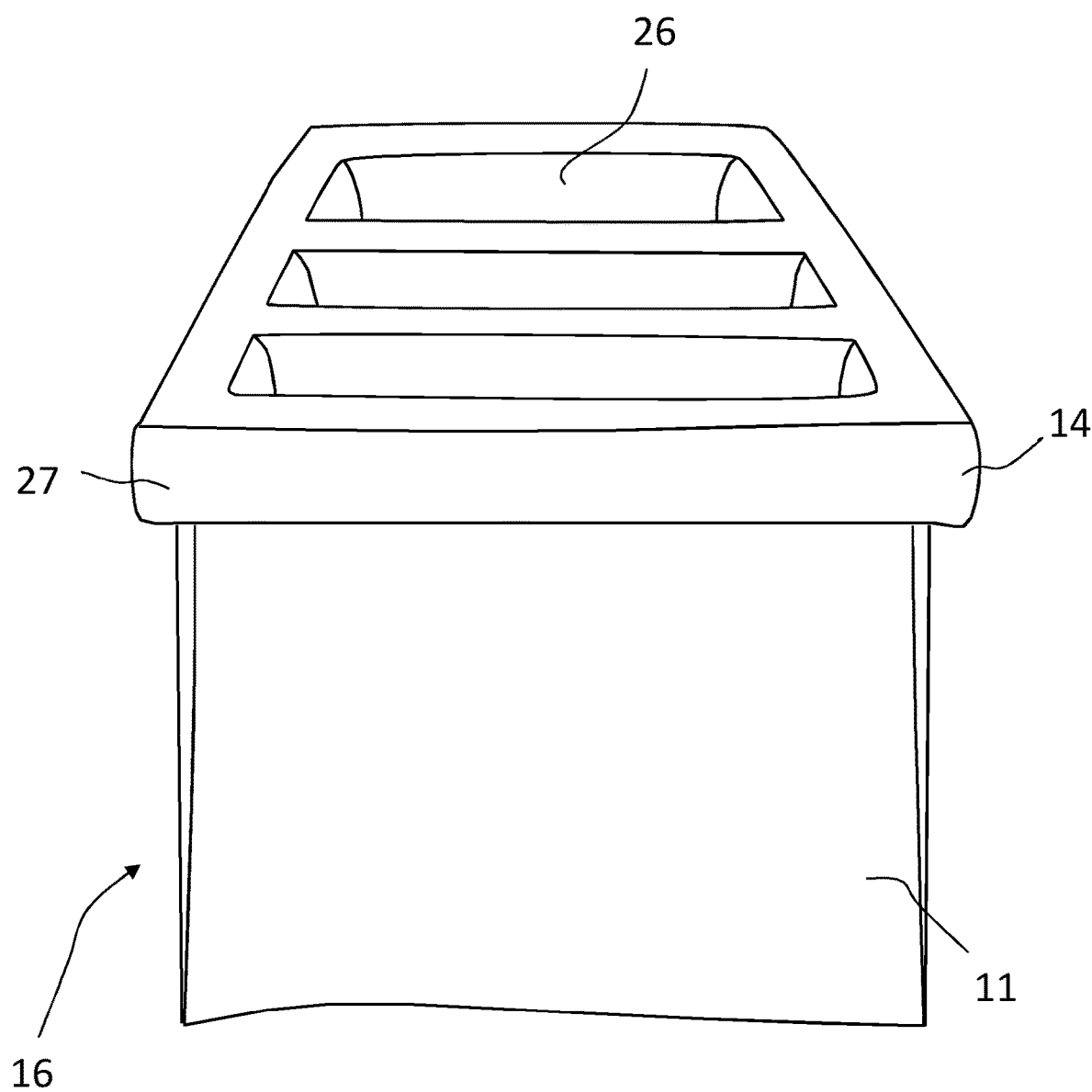
FIG. 6 shows a ready filter assembly according to one embodiment of the disclosure.

In FIG. 6 the insert 11 shown in FIGS. 4 and 5 is fastened to the frame 6 shown in FIG. 2 in a way that the insert 11 is fitted into the aperture 26 of the frame 6. In this embodiment, each bag 12 of the insert 11 will occupy one of the slots A-C. Thereafter, the open upper portion 14 comprising the stretch region 27 is bent over the frame part 6.1 to cover the entire top side 7a and the outer edges 7b and at least part of the bottom side 7d. The stretch region 27 presses the upper part 14 against the frame part 6.1, typically against the bottom side 7d and/or the outer edges 7b of the frame part 6.1, and thus fastens the insert 11 to the frame 6. The insert 11 is fastened to the frame 6 by the pressing force generated by the stretch region 27 against the frame 6, i.e. the frame part 6.1.

After installation the frame 6, particularly the frame part 6.1 may be completely covered by the insert 11. This means that the frame 6 is non-visible when viewed from the top or side. Indeed, the stretch portion 27 may extend around the frame 6, i.e. across the top side 7a, side edges 7b, and bottom side 7d as well as onto the inner edges 7c. Such a full coverage is particularly advantageous for protecting the frame 6 from impurities sustained in the filtered air. On the other hand, if the stretch portion is manufactured from a non-filter material, such as elastic fabric, it produces less friction against a mating surface of the host apparatus compared to filter material, whereby installation is facilitated. Nylon is therefore a particularly suitable mixture material for the stretch region in addition to a resilient mixture material, such as latex. Furthermore, when the frame 6 is fully enclosed by the insert 11, the filter assembly 1 will seal well against the host apparatus (e.g. an HVAC machine) compared to conventional exposed frames.

The insert 11 is detached from the frame part 6.1 by stretching the stretch region 27, after which the upper portion 14 of the insert 11 is removed from around the frame 6 and the insert 11 is removed from the aperture 26.

Figure 7:
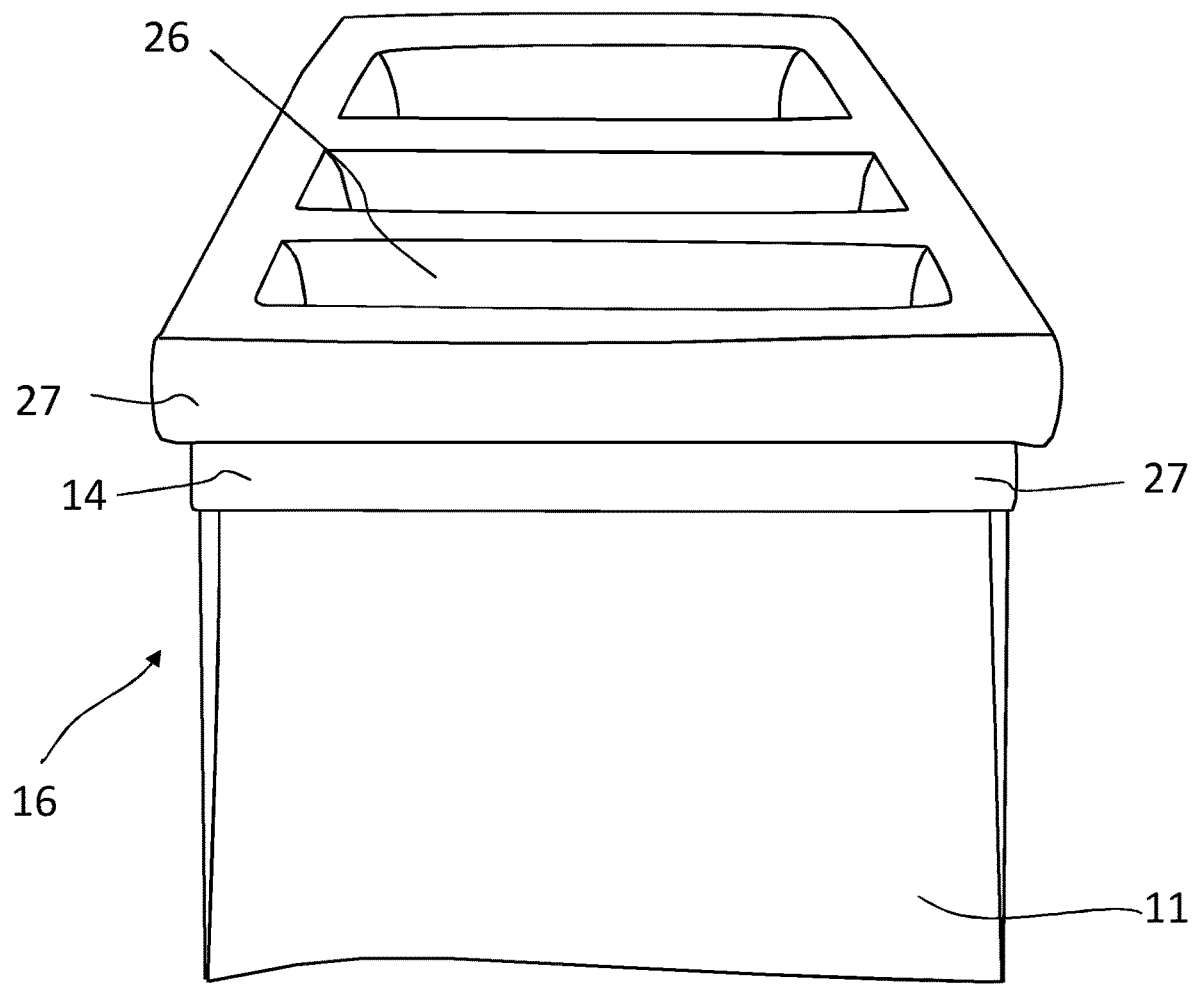
FIG. 7 shows a ready filter assembly according to another embodiment of the disclosure.

In the embodiment shown in FIG. 7. the frame 6 comprises the frame part 6.1 and the second frame part 6.2 as shown in FIGS. 3a and 3b. The insert 11 is fitted into the aperture 26 of the frame 6. The upper portion 14 comprising the stretch region 27 is bent over the frame part 6.1 to cover the entire top side 7a, the outer edges 7c and the bottom side 7d of the frame part 6.1. Further, the stretch region 27 of the upper portion 14 is bent over the second frame part 6.2 to cover the outer edges 7.2b of the second frame part 6.2. The stretch region 27 covers the outer edges 7.2b entirely or only partly. The stretch region 27 presses the upper portion 14 against outer edges 7.2b of the second frame part 6.2. Further, the stretch region 27 presses the upper portion 14 against the bottom side 7d, outer edges 7b and/or the top side 7a of the frame part 6.1. Thus, the insert 11 is fastened to the frame 6 by the pressing force generated by the stretch region 27 against the frame 6, i.e. frame part 6.1 and/or the second frame part 6.2.

The insert 11 is detached from the frame 6 by stretching the stretch region 27, after which the upper portion 14 of the insert 11 is removed from around the frame 6 and the insert 11 is removed from the aperture 26.

In the embodiments of FIGS. 6 and 7 the insert 11 is fastened to the frame 6 only by the pressing force generated by stretch region 27. Thus, the use of additional fasteners, such as zip or tape fasteners is not necessary. However, according to a further embodiment the assembly may comprise such an additional fastener. According to a particular embodiment the corresponding parts of the stretch region 27 and the inner edge 7c of the frame part 6.1 and/or the inner edge 7.2c of the second frame part 6.2 are provided with mutually coupling additional fasteners, such as Velcro strips, snap connectors, etc. Additionally or alternatively, the stretch region 27 may include a coupling having a shape coupling, such as a hook, designed to engage the frame part 6.1 or second frame part 6.2. Such a shape coupling may be attached to the stretch region 27 by means of a reinforced hole in the stretch region, ultrasonic welding, thermosetting glue, or a comparable joining method.

According to an embodiment of the invention the filter assembly 16 comprises two or more parallel frames 6 installed side by side. The inserts 11 are bent over said frames 6, as described in FIGS. 6 and 7. In this embodiment the insert materials bent over the adjacent frames 6 are in contact with each other and form a seal between the frames 6 to prevent air and/or dust from leaking through a gap between the frames 6. The frame 6 can be of the type shown in FIG. 2 or 3a and 3b.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of frames, slots, fasteners, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. A filter assembly, comprising:
   a frame comprising a frame part having a top side, a bottom side, inner edges defining an aperture and outer edges forming the outermost perimeter of the frame part, and
   a bag-like insert comprising filter material and having an open upper portion and at least one closed bottom portion, wherein:
   the insert is fitted into the aperture of the frame with the open upper portion bent over the frame part to cover the top side, the outer edges and at least part of the bottom side of the frame part,
   the upper portion of the insert, which is bent over the frame, comprises a stretch region made of stretchable material, and in that
   the insert is fastened to the frame by a pressing force generated by the stretch region against the frame.

2. The filter assembly according to claim 1, wherein the frame part is completely covered by the insert.

3. The filter assembly according to claim 1, wherein the frame comprises a second frame part projecting from the bottom side of the frame part and having inner edges defining the aperture and outer edges forming an outer perimeter of the second frame part, wherein the outer diameter of the second frame part is smaller than that of the frame part, and the stretch region of the upper portion is bent over the outer edges of the second frame part.

4. The filter assembly according to claim 3, wherein the stretch region is configured to press against the outer edges of the second frame part.

5. The filter assembly according to claim 1, wherein the stretch region is configured to press against the bottom side of the frame part.

6. The filter assembly according to claim 1, wherein the stretch region comprises an elastic band extending around the periphery of the upper portion.

7. The filter assembly according to claim 1, wherein said frame is provided with parallel intermediate bars across said aperture defining slots across said aperture, and wherein said insert has multiple bags formed in a pleated fashion having a shared open upper portion and separate closed bottom portions, and wherein each bag is arranged to fit into one slot.

8. The filter assembly according to claim 1, wherein said frame is made of a rigid material selected from any one of the following: wood, metal, polymer material, fiberglass, carbon fiber, or a composite material comprising any one of the above materials.

9. The filter assembly according to claim 1, wherein the filter assembly comprises at least two parallel frames arranged side by side, and inserts bent over said frames, and that the inserts bent over the adjacent frames are in contact with each other to form a seal between said frames.

10. The filter assembly according to claim 1, wherein the stretchable material of the stretch region is different to the filter material.

11. The filter assembly according to claim 10, wherein the stretchable material comprises a mixture of nylon and latex, rubber or Spandex.

12. The filter assembly according to claim 1, wherein:
    the insert is fastened to the frame only by the pressing force generated by the stretch region against the frame or wherein
    the corresponding parts of the stretch region and the inner edge of the frame part are provided with mutually coupling additional fasteners.

13. The filter assembly according to claim 12, wherein:
    the additional fastener comprises cooperative Velcro strips or snap connectors provided to the stretch region and frame part or wherein
    the additional fastener comprises a shape coupling, such as a hook, on the stretch region configured to engage the frame part.

14. The filter assembly according to any of the preceding claims, wherein the length of the stretch portion in a resting state is 20% or more than 20% shorter than the edge of the filter material defining the opening of the insert.

15. A method, comprising:
    removing a filter bag comprising:
    a filter region made of filter material and forming an open upper portion and at least one closed bottom portion, wherein the upper portion defines a periphery, and
    a stretch region made of stretchable and/or elastic material different to the filter material, which stretch region is provided to and around the outermost periphery of the upper portion of the filter region from a frame
    by first stretching the stretch region and then removing the upper portion of the filter bag from around the frame and the bottom portion of the filter bag from an aperture defined by the frame, and
    installing a new such filter bag by first fitting the bottom portion of the filter bag into the aperture and then stretching stretch region over and around the frame such that the open upper portion is bent over the frame part to cover the top side, the outer edges, which form the outermost perimeter of the frame part, and at least part of the bottom side of the frame part.

16. The filter assembly according to claim 3, wherein the stretch region is configured to press against the bottom side of the frame part.

17. The filter assembly according to claim 1, wherein the stretch region comprises a rubber band extending around the periphery of the upper portion.

* * * * *